United States Patent
De Nadai et al.

(10) Patent No.: US 12,220,849 B2
(45) Date of Patent: Feb. 11, 2025

(54) METHOD AND SYSTEM FOR OPERATING A FLUID ACTUATOR

(71) Applicant: INGLASS S.P.A., San Polo di Piave (IT)

(72) Inventors: Massimo De Nadai, San Polo di Piave (IT); Massimo Bisetto, San Polo di Piave (IT); Massimo Rossi, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 0 days.

(21) Appl. No.: 17/923,961

(22) PCT Filed: Dec. 15, 2021

(86) PCT No.: PCT/IB2021/061740
§ 371 (c)(1),
(2) Date: Nov. 8, 2022

(87) PCT Pub. No.: WO2022/189848
PCT Pub. Date: Sep. 15, 2022

(65) Prior Publication Data
US 2023/0405893 A1    Dec. 21, 2023

(30) Foreign Application Priority Data
Mar. 8, 2021    (IT) .................. 102021000005306

(51) Int. Cl.
*B29C 45/28*    (2006.01)
*B29C 45/82*    (2006.01)

(52) U.S. Cl.
CPC ............ *B29C 45/281* (2013.01); *B29C 45/82* (2013.01); *B29C 2045/2813* (2013.01); *B29C 2045/2848* (2013.01); *B29C 2045/824* (2013.01)

(58) Field of Classification Search
CPC .............................. B29C 45/281; B29C 45/82
See application file for complete search history.

(56) References Cited

FOREIGN PATENT DOCUMENTS

| CN | 111055450 A | 4/2020 |
|---|---|---|
| IT | 20190013278 A1 | 1/2021 |
| WO | 2021019462 A1 | 2/2021 |

OTHER PUBLICATIONS

International Search Report of PCT/IB2021/061740 Mailed on Apr. 22, 2022.

*Primary Examiner* — James Sanders
(74) *Attorney, Agent, or Firm* — Rivka Friedman (57) ABSTRACT

A method is described for operating an actuator adapted to move via a pressurized fluid circuit a valve pin of an injection nozzle for molten material within a mold, wherein the valve pin moves from a closing position, where no molten material passes through the nozzle, to an opening position, where molten material passes through the nozzle, and the actuator comprises a chamber and a piston that is movably mounted in the chamber, linearly displaced by the thrust of the fluid and connected to the valve pin to move it. The valve pin is moved by injecting or extracting a predetermined amount of fluid into/from the chamber.

18 Claims, 2 Drawing Sheets

METHOD AND SYSTEM FOR OPERATING A FLUID ACTUATOR

The invention relates to a method and system for operating a fluid-operated actuator that drives the valve pin of an injection molding machine; in particular, it relates to a method and system for adjusting/varying the stroke of the valve pin.

In injection molding machines, taken here as an example, molten material is injected into a mold through one or more injection nozzles whose opening and closing is controlled by a valve pin guided by an actuator. For complex parts, produced with multi-injection and sequential injection method, the positional control of the valve pin that opens and closes the nozzle is fundamental to obtain a high quality of the manufactured product (e.g. the finish). In particular, it is important to be able to adjust/variable the stroke of the valve pins, especially the opening stroke which determines the residual free space between the nozzle and the tip of the valve pin (area/section of passage of the injected material), and consequently determines the material flow rate and the speed of entrance into the mould cavity. Currently, for the molding of high-value products, the valve pins are controlled by electric actuators, which however require complex and expensive command and control devices (an electronic control unit+related software). The use of fluid-powered actuators is therefore less expensive, but they are not suitable for variable but precise stroke adjustment.

The main object of the invention is to improve this state of the art.

Another object is to take advantage of hydraulic actuators for positional control of the valve pin, start and stop positions as well as one or more intermediate stop positions or speed variation.

An aspect of the invention relates to a method of operating an actuator adapted to move via a pressurized fluid a valve pin of an injection nozzle (or several nozzles) for molten material into a mold,
wherein the valve pin moves from a closing position, where there is no passage of molten material through the nozzle, to an opening position, where there is passage of molten material through the nozzle,
wherein the actuator comprises
a chamber, and
a piston which is movably mounted in the chamber, linearly displaced by the thrust of the fluid and connected to the valve pin,
with the steps of
determining a quantity of fluid before sending it to or extracting it from the actuator, and
moving the valve pin by introducing or removing the predetermined amount of fluid into/from the chamber.

A preferred step envisages moving the valve pin by introducing or removing a predetermined amount of fluid into/from the chamber, e.g. by moving a predetermined amount between the chamber and an auxiliary reservoir.

Predetermined quantity means a quantity of fluid whose volume has been determined or defined or calculated or set before sending it to or extracting it from the actuator. The predetermination may be done e.g. by measurement of the volume, the weight, or the flow rate, or also by instantaneous measurement/counting (e.g. by means of a flow meter. e.g. with the cooperation of a valve, or similar systems) of the fluid sent to/extracted from the piston chamber. The predetermined amount of fluid displaced into/from the chamber translates into a proportional linear displacement of the valve pin.

In a variant, the predetermined amount of fluid is measured and determined before injecting it into the actuator chamber. By calculating the amount of fluid injected into said chamber, e.g. by means of a flow-meter, it is possible to determine not only the stroke of the valve pin but also any intermediate positions within the total stroke of the valve pin. Such intermediate position may be multiple and the valve pin can stop in those positions for a predetermined time and then continue the opening movement or it can reverse the direction of movement, for a predetermined time (downstream), with subsequent resumption of the opening movement.

Preferably, the predetermined amount of fluid to be moved into/from said chamber is stored elsewhere, in a volume having a controlled capacity, and from the volume said amount is moved into the actuator chamber and/or vice versa. Thus, the predetermined amount of fluid is determined only once and is reused in subsequent injection cycles. A disposable system is also possible, wherein the predetermined amount of fluid is sent to the actuator, ejected from it and then disposed of or mixed with other fluid. In this case it is necessary to re-determine said predetermined amount of fluid at each injection.

The method applies to a unidirectional or bidirectional movement of the valve pin.

In particular, the method envisages an auxiliary reservoir fluidically connected to the actuator chamber, and the predetermined amount of fluid corresponds to a predetermined variation in fluid contained in the auxiliary reservoir, in particular the predetermined amount of fluid corresponds to a predetermined change in the volume (the capacity) of a chamber, comprised in the auxiliary reservoir, containing the fluid.

The method applies to both a filling of the actuator chamber and an emptying of the actuator chamber.

Specifically, the valve pin is moved from a nozzle opening position to a closing position by transferring said amount from the auxiliary reservoir into the chamber.

Specifically, the valve pin is moved from a nozzle closing position to an opening position by transferring said amount from the chamber into the auxiliary reservoir.

The opening position of the valve pin may correspond to an end-of-travel position opposite the closing position and/or may correspond to a position intermediate to the end-of-travel position opposite the closing position.

By subtracting a volume of fluid Vc from the fluid contained in the actuator chamber, an accurate displacement of the actuator piston proportional to Vc is obtained. Similarly, by extracting a volume of fluid Vt from the auxiliary reservoir and injecting it into the actuator chamber results in an accurate displacement for the actuator piston proportional to Vt.

In particular, the quantities Vc and Vt are determined by a change in volume of the chamber in the auxiliary reservoir. For example, the auxiliary reservoir has a variable-volume chamber capable of expanding and receiving the volume Vc and capable of contracting and expelling the volume Vt.

Called Vmin the minimum volume (e.g. in $cm^3$) that can be reached by the chamber of the auxiliary reservoir after the fluid has been expelled, and called Vmax the maximum volume (e.g. in $cm^3$) that can be reached by the chamber of the auxiliary reservoir after the fluid has been injected into it, for example the following is valid $$Vmax=Vmin+Vt, \text{ and/or } Vmin=Vmax-Vc.$$

Vmin and/or Vmax are adjustable to determine the change in volume of the chamber of the auxiliary reservoir, hence the determination of Vc and Vt.

Vmin may be zero, but not necessarily, i.e. the chamber of the auxiliary reservoir does not necessarily reach zero volume after Vt is expelled, and may contain a residual amount of fluid. Preferably Vc=Vt, to give cyclicity to the movement of the valve pin, but not necessarily.

Then, according to a preferred variant of the method, the actuator stroke can be adjusted/varied by changing the value Vc and Vt as needed, preferably by varying Vmax and/or Vmin.

That is, said amount of fluid is determined by adjusting the maximum change in the volume of the auxiliary reservoir chamber.

Because of the above, if the geometry of the auxiliary reservoir varies, Vmax varies, i.e. the maximum amount that can be contained by the auxiliary reservoir chamber varies.

The method does not depend on the particular hydraulic circuit used to transfer the fluid, nor on the type of fluid.

According to a preferred variant of the method, the value Vmax and/or Vmin is adjusted by varying the structural configuration of the auxiliary reservoir.

Specifically, the auxiliary reservoir is modified by displacing a wall of a closing cavity that delimits the volume of the auxiliary reservoir chamber occupied by the predetermined amount of fluid. The wall may be rigid, such as the surface of a plunger or piston, or elastic. Or the auxiliary reservoir is varied by deforming in space the walls of a closing cavity delimiting the volume of the auxiliary reservoir chamber occupied by the predetermined amount of fluid.

Or the auxiliary reservoir is varied by causing the walls of a closing cavity delimiting the chamber of the auxiliary reservoir volume occupied by the predetermined amount of fluid to expand or contract, e.g. by variation of the temperature of the walls or elastic stretching.

Or the auxiliary reservoir may be varied by varying the amount of a filler material present inside a closing cavity delimiting the chamber of the auxiliary reservoir volume occupied by the predetermined amount of fluid. The volume of the filler material subtracts from the volume available for the fluid, and thus Vc and Vt drop. By removing the filler material the volume available for the fluid increases, and thus Vc and Vt increase.

According to a preferred variant of the method, the auxiliary reservoir has the closing cavity or chamber bounded by a piston, and the linear position of the auxiliary reservoir piston is detected as fluid is transferred from the auxiliary reservoir chamber to a chamber of the actuator, an end-of-travel position of the valve pin is determined by adjusting the stroke of the auxiliary reservoir piston using the proportionality between change in the position of the auxiliary reservoir piston, amount of fluid transferred between the auxiliary reservoir and the actuator chamber as a result of the movement of the auxiliary reservoir piston, and change of valve pin position.

Another aspect of the invention relates to a system for driving an actuator comprising a chamber and a piston that is displaceable/movable within the chamber as a result of the action of a pressurized fluid on the piston, and connected to the valve pin of a melt material injection nozzle for injection molding, the system being configured to adjust/vary the valve pin stroke and comprising a device or means for forcing the transfer of a predetermined amount of fluid between the outside and inside of the chamber, wherein the amount of fluid is determined before sending it to the actuator or extracting it from the actuator, so as to bring/move the valve pin from a closing position, in which there is no passage of molten material, to an opening position, in which there is passage of molten material, by injecting the predetermined amount of fluid from the outside into the chamber or by extracting the predetermined amount of fluid from the chamber to the outside, and/or so as to bring/move the valve pin from an opening position, wherein there is passage of molten material, to a closing position, wherein there is no passage of molten material, by extracting the predetermined amount of fluid from the chamber or by sending the predetermined amount of fluid into the chamber, respectively.

In particular, the system comprises an auxiliary reservoir of fluid (preferably external to the actuator) configured to contain a volume of fluid, a fluid circuit to put into communication the chamber and the auxiliary reservoir, a device or means for forcing the transfer of a predetermined amount of fluid between the auxiliary reservoir and the chamber, so as to bring/move the nozzle valve pin from a closing position, wherein there is no passage of molten material, to an opening position, wherein there is passage of molten material, by injecting fluid from the auxiliary reservoir into the chamber or extracting fluid from the chamber into the auxiliary reservoir, and/or so as to bring/move the nozzle valve pin from an opening position, wherein there is passage of molten material, to a closing position, wherein there is no passage of molten material, by extracting fluid from the chamber and putting it inside the auxiliary reservoir or by extracting fluid from the auxiliary reservoir and putting it inside the chamber, respectively.

The valve pin may or may not be part of the actuator, or it may be directly or indirectly connected to/controlled by the actuator with the interposition of additional and multiple mechanical devices.

In particular, the system comprises a device or means for determining and/or regulating the amount of fluid transferred and/or transferable from the auxiliary reservoir to the chamber and vice versa. With said system for example the total and maximum stroke of the actuator piston may be adjusted, corresponding to the opening end-of-travel position of the valve pin, the closing end-of-travel position of the valve pin being defined by a mechanical abutment of the valve pin against the nozzle gate (conical plugging) or of the piston itself against an abutment made in the same actuator body (cylindrical plugging).

According to a preferred variant, which allows for adjustment of an end-of-travel position of the piston, the auxiliary reservoir comprises an adjustable volume for containing fluid to be sent into or received from the chamber. In other words, with reference to what has been already explained for the method, the auxiliary reservoir is configured to be able to vary its Vmax and/or Vmin.

Preferably, the auxiliary reservoir has a capacity for the fluid that is adjustable. The fluid capacity of the auxiliary reservoir is adjustable in various ways.

E.g. the auxiliary reservoir comprises a closing cavity adapted for containing said predetermined amount of fluid; wherein the closing cavity may reach a minimum volume Vmin and/or a maximum volume Vmax. More particularly, the auxiliary reservoir comprises a deformable shell defining said closing cavity; wherein the shell is deformable so that the closing cavity reaches a minimum volume Vmin and/or a maximum volume Vmax.

Specifically, the closing cavity may comprise:
a movable wall to vary the internal volume of the cavity. The wall may be rigid, such as the surface of a plunger, or elastic; and/or
walls that are expandable or contractible, e.g. through means for varying the temperature of the walls or an elastic stretching of the walls.

Or, the auxiliary reservoir comprises a closing cavity having a filler material in it, and means for varying the amount of filler material within the closing cavity, such that the variation in filler material results in a minimum residual volume Vmin and a maximum residual volume Vmax of the cavity occupiable by the fluid.

In a variant, the auxiliary reservoir comprises a piston that is displaceable/movable within a chamber of the auxiliary reservoir as a result of the action of the pressurized fluid,
the chamber of the auxiliary reservoir being divided by the piston into
a first sub-chamber fluidically connected to the actuator chamber, and a second sub-chamber fluidically connected to said device or means for forcing the transfer,
the first and second sub-chambers being defined on opposite sides of the piston,
the piston stroke being adjustable to define the maximum and/or minimum volume of the first sub-chamber.

In particular, the system comprises mechanical, electrical and/or electronic means for regulating and controlling said piston stroke (e.g. linear encoders, rotary encoders, laser or infrared reading systems, mechanical screw stops, screw/nut screw systems, fiber optics, switches, microswitches, etc.).

Preferably, the system comprises an electronic control unit for controlling the system components, in particular the piston and the device or means for forcing the transfer of the predetermined amount of fluid, and the means mentioned in any or each of the claims.

The means of regulation or control are preferably connected with the control unit to supply it with the real-time position of the piston. On the basis of such position the control unit is able to determine/vary the movement of the piston and consequently of the valve pin (it is possible to vary the stop position, the movement speed of the valve pin increasing or decreasing it, the resting time when stopped, etc.).

According to a preferred variant of the method and system, the auxiliary reservoir has the closing cavity or chamber delimited by a piston, and in particular said wall displaceable in the closing cavity may advantageously be a surface of said piston.

Said wall or piston in the auxiliary reservoir may, for example, be movable between two positions, and the volume swept by the wall determines the volume of said predetermined amount of fluid. In particular, the wall or piston of the auxiliary reservoir is mounted so that at one of said two positions it abuts against a movable abutment element. The position of the movable abutment element is adjustable and the position of one of said two positions, and thus the volume of said predetermined amount of fluid, can then be adjusted. In a variant, the movable abutment element is an element screwable in the auxiliary reservoir body.

Preferably, the auxiliary reservoir comprises a blocking member for blocking the position of the movable abutment member.

For example, a linear position sensor may communicate with the control unit that processes the data emitted by the sensor, showing the position of the valve pin on a display, and allowing the operator to verify the correct operation of the system inside the mould.

In a variant, the circuit comprises
a first line of fluid transport between the chamber and the auxiliary reservoir,
a second line of fluid transport between the chamber and the means or device for forcing the fluid transfer,
a third line of fluid transport between the auxiliary reservoir and the means or device for forcing the fluid transfer, wherein
the first and second line lead into the actuator chamber to inject and/or extract fluid on opposite sides of the piston,
the third line carrying fluid different and isolated from that flowing in the first line.

In particular, the circuit comprises
a first line of fluid transport between the chamber and the first sub-chamber,
a second line of fluid transport between the chamber and the means or device for forcing the fluid transfer,
a third line of fluid transport between the second sub-chamber and the means or device for forcing the fluid transfer, wherein
the first and second line lead into the actuator chamber to inject and/or extract fluid on opposite sides of the piston,
the third line carrying fluid different and isolated from that flowing in the first line and leading into the second sub-chamber of the auxiliary reservoir to inject or extract fluid on one side of the two said opposite sides of the auxiliary reservoir piston.

The direction of fluid displacement/movement from the auxiliary reservoir to the actuator, like the associated connections, may be reversed without varying the effects and advantages of the invention (e.g. like reversing the inputs of the lines 19a with 19b, see following figures below).

Preferably there are means for fluidically connecting the two sub-chambers, for initial fillings or fluid vents.

In a variant, the change in volume of said closing cavity or chamber of the auxiliary reservoir (e.g. the transfer of fluid into the second sub-chamber) is accomplished by pushing the fluid through an air or gas system.

In a variant, the system comprises means for varying the fluid present on one of the two fluid transport lines using, for example, air or gas (compressible fluids). The variation of the fluid entails adding or changing some of the components of the circuit, but does not vary the principle of operation.

In a variant, the system comprises a mechanical system (e.g. a spring-operated system) for achieving the movement of the valve pin in the actuator in one direction.

Preferably, the system comprises leaks or spillovers to initially fill the first line with fluid or compensate for any leaks.

Another aspect of the invention relates to a software for performing one or each of the steps of the method by controlling the flow of fluid.

The invention is applicable, for example, to systems with a valve pin having a conical or truncated-cone shaped end cooperating with a gate having a cavity of complementary shape, or to systems with a valve pin having a cylindrical end cooperating with a gate having a cavity of complementary shape, or to further different forms of occlusion.

The invention is e.g. also applicable to systems where the auxiliary reservoir feeds multiple actuators; and/or where an actuator drives multiple valve pins simultaneously (the actuator piston is integral with multiple valve pins).

A variant of the invention offers the advantage of being able to monitor the position and/or speed and/or acceleration of the valve pin indirectly, without directly acting on the actuator attached to the hot runner within the mold.

Note in fact that the instantaneous valve pin position can be derived by measuring in real time, for example with a flow meter,
 the amount of fluid travelling into/from the auxiliary reservoir, or
 the fraction of said predetermined amount of fluid that has arrived inside the valve pin chamber and/or has come out therefrom, or
 the position of said wall or piston.

The position of said wall or piston can advantageously be monitored, for example, by a position sensor, e.g. a linear sensor (of various types: potentiometric, fiber optic, magnetic, laser, etc.). The sensor then allows the instantaneous position of the piston and valve pin to be indirectly monitored.

This aspect also highlights a diagnostic application of the above method or system, i.e. to detect possible malfunctions of the hydraulic system or oil leaks or spillovers cycle after cycle. The above method or system can be applied to a pre-existing plant to verify the correct movement of a valve pin during the injection phase.

For maximum accuracy, said fluid is preferably a liquid, e.g. oil. The liquid is incompressible and ensures proportionality between the volume of fluid displaced and the linear displacement of the actuator piston.

Figure 1:
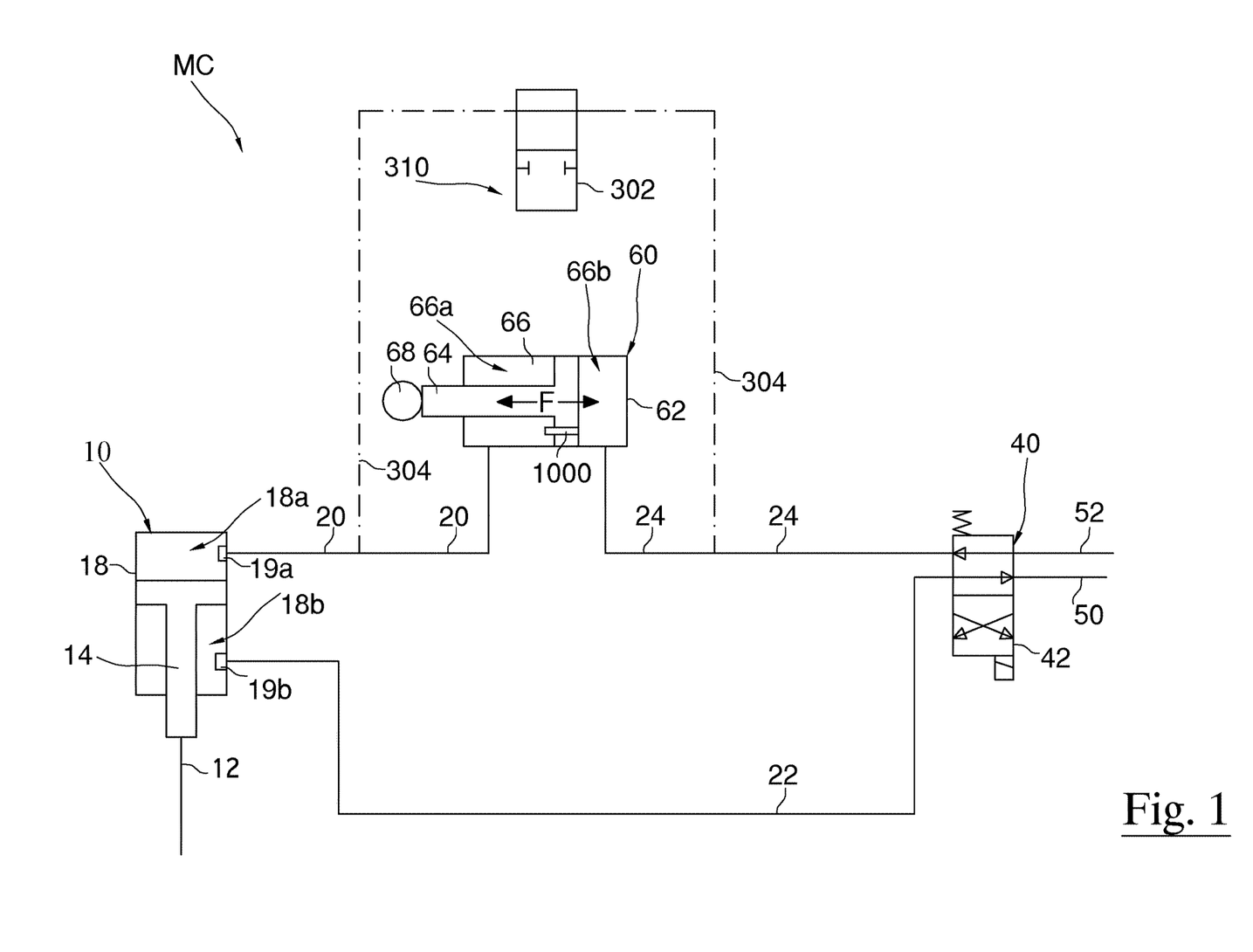
FIG. 1 shows a schematic of the system.

In the variant with an auxiliary reservoir comprising a piston with a first and second sub-chamber, a simple way to make the means for fluidically putting in communication the two sub-chambers is to place a valve on the piston and have the valve open—to fluidically connect the two sub-chambers—e.g. when the piston abuts against a wall of the auxiliary reservoir (see valve 1000 in FIG. 1).

However, due to (physiological) leakages between the system seals, it can happen that the volume or quantity of liquid (e.g. oil) in the first sub-chamber progressively increases, e.g. preventing the contact between the valve and the cylinder wall. As a result, the valve always remains closed and the piston of the auxiliary reservoir progressively moves away from the end-of-travel stop that would establish the correct amount to be withdrawn from the actuator during the opening phase. The critical result is that the stroke of the actuator in the opening phase decreases in proportion to the unwanted increase in fluid, and can asymptotically reach stall.

To solve this problem the method envisages that
 only while moving the valve pin from a nozzle opening position to a closing position by transferring said amount of fluid from the auxiliary reservoir into a chamber of the actuator,
 the two sub-chambers of the reservoir are selectively put into fluidic communication in response to a command or signal generated externally to the two sub-chambers.

The advantage is being able to more accurately and repeatably guarantee that the two sub-chambers are actually communicating for some time during the working cycle.

In particular there is the step of
 detecting an event external to the auxiliary reservoir chambers and indicative of the condition that the valve pin is traveling toward the closing position, and
 making the two chambers communicable only if and when the event is detected.

The command or signal may be generated independently of the current operating condition of the fluid circuit in which the auxiliary reservoir is inserted, e.g. by timing, or by synchronizing the command with the closing phase.

The command or signal may be generated depending on the current operating condition of the fluid circuit in which the auxiliary reservoir is inserted, e.g. by detecting with a sensor a quantity or an internal variable of the fluid circuit in which the auxiliary reservoir is inserted, and, as a function of the value of such detected variable or quantity, the two sub-chambers are put in fluidic communication or not.

The command or signal may be, for example, an electrical signal or derived from the action of the fluid circulating in the circuit in which the auxiliary reservoir is inserted. For example, the pressure on the line carrying fluid from the actuator to an outlet, or a lower-pressure point when the valve pin moves toward the closing position, can be detected. The pressure drop detected in this circumstance can serve to trigger said command.

The problem is solved also by a system like the above comprising:
 an auxiliary conduit for selectively putting the two sub-chambers in fluidic communication, either directly or indirectly,
 a valve, for opening or closing the auxiliary conduit, which normally inhibits flow in the auxiliary conduit (closed valve) and provided with a control input to drive its status (to switch it and allow flow in the auxiliary conduit, open valve),
 means for driving the control input which are external to the two sub-chambers, and configured to open the valve only while the valve pin is moved from a nozzle opening position to a closing position by transferring said amount from the auxiliary reservoir into a chamber of the actuator.

The system may comprise a valve configured to make the two chambers communicable only if and when the event is detected, or a valve to open or close the auxiliary conduit. By valve it is generally meant a device or assembly of parts capable of controlling the flow of fluid.

The auxiliary by-passing conduit may be external or internal to the sub-chambers.

The means for driving the control input may be a timer synchronized with the closing phase of the valve pin, or may comprise a sensor for detecting a quantity or internal variable of the fluid circuit in which the auxiliary reservoir is inserted, and are configured to open the valve as a function of the value of such detected variable or quantity.

In particular in the method or system said variable or quantity e.g. is, or the event is the reaching of a threshold value for a quantity in the circuit which e.g. is:
 the fluid pressure at a point in the circuit outside the chambers, and/or
 a fluid quantity at a point in the circuit outside the chambers, and/or a fluid quantity in a chamber of the actuator, and/or
a fluid quantity in a chamber of the auxiliary reservoir, and/or
the valve pin position, and/or
the position of the movable wall in the auxiliary reservoir, and/or
a command sent by the control unit resulting from the programmed injection cycle.

The means for driving e.g. comprise an electrical or electronic control unit (a PC or microprocessor).

The system can operate more simply even without the aforementioned dedicated sensor. Said means for driving may convert an action of the fluid circulating in the circuit in which the auxiliary reservoir is inserted into a command for the valve. E.g., the valve may be configured to change its open/closed state as a function of a pressure present in a line of the circuit, e.g. that which carries fluid, e.g. from a pump, to the actuator when the valve pin moves toward the closing position. The pressure increase detected in this circumstance can serve to trigger said command and open the valve.

A variant of the method envisages that when the event is detected the moving wall in the auxiliary reservoir moves due to the thrust of fluid at the same pressure applied to opposite surfaces of the movable wall that have different areas.

A preferred system is a system for operating an actuator via a pressurized fluid circuit to move a valve pin of a nozzle for injection of molten material into a mold, the system comprising:
    an actuator comprising
        a chamber and
        a piston that is movably mounted in the chamber, linearly displaceable thanks to the thrust of the fluid and connected to the valve pin to move it from a closing position, where there is no passage of molten material through the nozzle, to an opening position, where there is passage of molten material through the nozzle, and vice versa;
    an auxiliary reservoir that is connected to the actuator chamber and comprises two chambers for fluid separated by a movable wall,
    the first chamber of the auxiliary reservoir being fluidically connected to the actuator chamber, so that
        the displacement of the movable wall results in a predetermined amount of fluid being sent from the auxiliary reservoir chamber to the actuator chamber, or vice versa with a displacement of the movable wall in opposite direction, and
    the second chamber of the auxiliary reservoir is connectable to a pressurized fluid source to move the movable wall and thus bring the valve pin toward the closing position,
    the system comprising means for detecting an event external to the auxiliary reservoir chambers and indicative of the condition that the valve pin is traveling toward the closing position, and means for making the two auxiliary reservoir chambers communicable only if and when the event is detected.

In a variant, in the system the means for detecting comprise a sensor, or means, for detecting the reaching of a threshold value for a circuit quantity, e.g.
    the fluid pressure at a point outside the chambers, and/or
    an amount of the fluid at a point outside the chambers, and/or
    an amount of fluid in an actuator chamber, and/or
    an amount of fluid in an auxiliary reservoir chamber, and/or
    the valve pin position, and/or
    the position of the piston in the auxiliary reservoir.

In a variant, in the system the valve comprises an input for sensing the value of a circuit quantity at a point outside the chambers but communicating with them, e.g.
    the fluid pressure at a point outside the chambers, and/or
    an amount of the fluid at a point outside the chambers, and/or
    an amount of fluid in an actuator chamber, and/or
    an amount of fluid in an auxiliary reservoir chamber, and/or
    the valve pin position, and/or
    the position of the piston in the auxiliary reservoir;
    and is configured so as to open when a threshold value for the detected value is reached.

In a variant, the auxiliary reservoir comprises a pass-through conduit, which at an inlet can be fed by a pressurized fluid source and at the opposite inlet is connected with the actuator chamber other than the chamber connected with the auxiliary reservoir, the valve being mounted in fluidic communication with the pass-through conduit to be actuated by the fluid pressure in said pass-through conduit.

In a variant, the movable wall is the head of a piston movably mounted in the auxiliary reservoir between two opposite end-of-travel positions,
    the head comprising opposite surfaces having different areas and forming walls of the two chambers of the auxiliary reservoir respectively,
    so that the piston can move due to the thrust of fluid at the same pressure applied to the surfaces.

In a variant, the means for making the two chambers communicable comprise an auxiliary conduit external to the chambers configured to make the two chambers communicable.

In a variant, the auxiliary reservoir internally comprises said auxiliary conduit, and the valve is mounted in the auxiliary reservoir.

In a variant of the method, during the valve pin closing phase the movable wall reaches an end-of-travel stop and simultaneously the valve pin stops.

In a variant, the means for making the two chambers communicable comprises an auxiliary conduit internal to the chambers configured to make the two chambers communicable.

In a variant, the means for making the two chambers communicable, and/or the means for detecting the external event, comprise or consist of a valve, in particular installed in said conduit.

In a variant, the valve comprises a movable member for blocking or allowing fluid communication between the two chambers. Preferably, the movable member is mounted within a seat formed in the auxiliary conduit. Preferably the movable member is mounted so as to occlude or clear said auxiliary conduit as a function of its position.

The advantages of the invention will be even clearer from the following description of a preferred system, in which reference is made to the accompanying drawing in which.

In the figures equal elements are indicated by equal numbers.

The system MC in FIG. 1 is used to drive an actuator 10.

The actuator 10 is fixed on a support, such as a hot runner (manifold) or a plate or a mold, in vertical position (along the same axis) or in a different position such as orthogonal (either directly or by interposition of additional mechanical means), and is intended to move/displace a valve pin 12 for an injection nozzle.

The valve pin 12 is connected to a piston 14 that is linearly movable within a chamber defined by a casing 18. Such chamber, in the example of FIG. 1, is divided by the piston 14 into a first chamber 18a, communicating with an inlet 19a, and a second chamber 18b, communicating with an inlet 19b. For example, the chamber 18a is isolated from the chamber 18b.

Through the fluid inlets 19a, 19b, fluid, e.g. oil, can be injected into or extracted from the chambers 18a or 18b on opposite sides of the piston 14, respectively, so that it can be moved linearly in opposite directions (from the closing position toward an opening position and from an opening position toward the closing position). Then, by alternately injecting and extracting fluid into/from the chambers 18a and 18b, the piston 14, and consequently the valve pin 12, can be moved. The movement of the latter determines the (total or partial) opening or closing of the nozzle with the consequent passage or obstruction of the molten material. The closing end-of-travel position of the valve pin 12 is established by the mechanical abutment of the valve pin 12 against the so-called "gate" of the nozzle so that there is no passage of molten material, or a suitable end-of-travel stop (not shown) is provided between the piston and the actuator body 10.

The stroke of the valve pin 12 from the closing position to the maximum opening position or to the opening end-of-travel position is, as will be seen below, adjustable.

A reservoir 60, external to the actuator 10, comprises an outer casing 62 having within it a piston 64 linearly movable within a chamber defined by the casing 62. The piston 64, like the piston 14, divides the main chamber into two sub-chambers 66a, 66b.

A line 20 carries fluid between the inlet 19a and the chamber 66a, and vice versa.

A line 22 is connected to inlet 19b.

A line 24 is connected to the chamber 66b.

A line 52 is connected to a pressurized fluid source, such as a pump.

A line 50 is connected to a low pressure fluid outlet, such as a reservoir or the external environment.

A (known) fluid diverter 40, having a displaceable drawer 42, has inputs connected to the lines 50, 52 and outputs connected to the lines 22, 24. The diverter 40 is used to reverse (in a known manner), at each complete cycle, the direction of fluid flow in the lines 22, 24, the direction determining the direction of movement of the valve pin 12, opening or closing.

Through the first line 20 the fluid is injected into the chamber 18a against one side of the piston 14, while through the line 22 the fluid is injected into the chamber 18b on the opposite side of piston 14.

Similarly, through the line 20 the fluid is injected into the chamber 66a against one side of piston 64, while through the line 24 the fluid is injected into the chamber 66b on the opposite side of piston 64. Injecting fluid from the line 24 into the chamber 66b pushes the piston 64 against the chamber 66a.

Preferably, leaks or spillovers are provided to initially fill the line 20, the chamber 66a and the chamber 18a with fluid or to compensate for any small fluid losses during operation. For example, a valve 1000 may be used on the piston 64.

The reservoir 60 is provided with manual or power-assisted means 68 for adjusting or varying the maximum stroke width of the piston 64 toward the chamber 66a and/or 66b, so that the maximum and/or minimum volume of the chamber 66a (or—which is the same—the minimum and/or maximum volume of the chamber 66b) can be adjusted. The means 68 can be made, for example, with a mechanical abutment between the piston 64 and the casing 62, wherein the position of the abutment point or of the mechanical abutment is adjustable along the translation axis of the piston 64 (see arrow F). Preferably, there is a blocking means for blocking the position of the mechanical stop after it has been selected.

The reservoir 60 is preferably equipped with means (not shown) for sensing the linear position of the piston 64, for remote and automatic position control and/or precise position adjustment. E.g., the position of the piston 64 is detected by a linear encoder, a Hall sensor, a toothed wheel/nut screw mechanical system, etc.

In the lines 24 and/or 20 and/or 22 optional flow regulators are also inserted, which allow, in addition to a homogeneous movement, the setting of different movement speeds of the piston 14.

Operation

By injecting fluid into the chamber 66b, through the action of the pump, via line 24, the piston 64 is pushed and fluid is injected from the chamber 66a into the chamber 18a via the line 20. Thus, it is possible to move the valve pin 12 from the opening position toward the closing position, or toward the closing end-of-travel position (downward in FIG. 1).

In this phase, the total amount of fluid Q1 injected into the chamber 18a by the line 20 coincides with a variation or portion of the amount of fluid stored in the chamber 66a. Such variation or portion of the fluid quantity is determinable, for example, by adjusting the end-of-travel means 68 of the piston 64 as it moves toward (and against) the chamber 66a, or is automatically determined by the maximum volume that the chamber 18a reaches at the closing end-of-travel position. Or said change in fluid volume is determined/processed by the central control unit based on sensing, by suitable non-show means (e.g. a linear encoder), the current position of the piston 64. In this way, the change in the volume of fluid in motion can be varied remotely (via a tablet or similar) without the need for action at the machine/press. The linear encoder, or similar means, also lends itself to the detection and control of intermediate stop positions for the valve pin.

It is not necessary for the piston 64 to end up zeroing the volume of the chamber 66a, because the initial amount of fluid in the chambers 66a and/or 18a is adjustable, during installation and/or subsequently. Preferably, the maximum volume of fluid contained in the chamber 66a is always greater than the maximum volume of the chamber 18a, so that there is a reserve of fluid necessary to compensate for any leakage between the various branches of the fluid circuit.

By reversing the state of the diverter 40, fluid is injected into the chamber 18b through the line 22, and the valve pin 12 can be moved from the closing position toward the opening position, or toward the opening end-of-travel position (upward in FIG. 1). The incoming fluid from the line 22 pushes the piston 14 against the chamber 18a. The piston 14 in turn pushes fluid out of the chamber 18a and into the chamber 66a, to move the piston 64 in the opposite direction than before. At this phase, the amount of fluid Q2 displaceable from the chamber 18a to the chamber 66a can be determined by the end-of-travel means 68 of the piston 64 as it moves toward the chamber 66b.

The stroke of the piston 64 is adjusted by the means 68 to define the volume/quantity of fluid to be displaced, injected and/or extracted to/from the chamber 18*a* in order to achieve the desired stroke, e.g. the opening stroke, of the valve pin 12; for example, a stroke of 10 to 40 mm, e.g. 25 mm.

By acting on the means 68, one can vary Q1 and/or Q2.

The geometry of the system ensures that a change Q1, Q2 of fluid in the chamber 18*a* results in a corresponding displacement of the piston 14. The value Q1, Q2 then determines a constraint on the motion of the piston 14 inside the chamber 18, establishing its stroke width and/or the end-of-travel position during the opening phase.

The system and method described can control the valve pin for a single nozzle or, according to the same logic, can simultaneously control two or more nozzles with the same actuator. Alternatively, several valve pins with different actuators are connected to reservoir 60 tapping the lines 20 and 22 to be supplied with fluid. The volume of fluid moving in the circuit will be modified proportionally, by suitable means not shown, by dividing the volume of fluid moved among the various actuators, which is necessary in sequential injection systems.

Of course, the invention can also be applied, without substantial modification, in systems in which the actuator and/or external reservoir envisages the use of a multi-stage piston and/or multiple chambers (see WO2004027302). In the variant shown in FIG. 1, the external reservoir 60 has a piston 64 movable within a chamber 66 due to the fluid thrust. In a variation, the piston 64 may be actuated from outside the reservoir 60 in a controlled manner such that the piston 64 follows a dynamic reference (e.g. a speed and/or position reference) to control, accordingly, the dynamics of the valve pin 12.

For example, the piston 64 may be driven by an electric gear motor controlled by an electronic control unit, through which various dynamic profiles are applicable to the piston 64.

Preferably, the system MC comprises a manual opening system for the valve 1000, which is advantageous during installation, and in particular comprises means for pushing the piston head 64 against the inner surface of the casing 62 (only towards the left in FIG. 1, concordant with the piston stem 64).

In the system of FIG. 1, the roles of the chambers 66*a*, 66*b* can be interchanged; that is, the chamber sending fluid to the actuator 10 can also be 66*b*; and the reservoir 60 can be inserted on the line 22.

To prevent, due to (physiological) leakage between the seals of the system, the volume of fluid in the chamber 66*a* from progressively increasing, the system MC comprises means for selectively putting the chambers 66*a*, 66*b* into communication. Said means also serve to balance the pressure present between the chambers 66*a*, 66*b*, and/or to expel any air pockets that may form during initial fluid filling.

An example of said means is the valve 1000 in FIG. 1 arranged on the head of the piston 64.

When open, the valve 1000 allows fluid to flow between the chambers 66*a* and 66*b*, while when it is closed it does not. During the entire alternating movement of the piston 64 the valve 1000 remains closed, while it is mounted in such a way that it is opened when the piston reaches the closing end-of-travel member (only if the end-of-travel member is in the maximum stroke position, i.e. if the piston 64 hits the wall of the housing 62, on the left in the drawing) corresponding to the maximum compression of the chamber 66*a*.

Automatic operation of the valve 1000 is achieved if, for example, it is pushed and opened by contact with the inner surface of the housing 62, thereby allowing excess fluid and air pockets to flow from the chamber 66*a* into the chamber 66*b*.

However, a volume of fluid in the chamber 66*a* that becomes too large over time may prevent proper contact between the valve 1000 and the cylinder wall 62, so progressively the piston 64 moves away from the end-of-travel member that would establish the correct amount to be extracted from the actuator 10.

A variant involves eliminating the valve 1000 and selectively connecting the chambers 66*a*, 66*b* via a valve external to the chambers 66*a*, 66*b* and inserted into a by-pass conduit for the lines 20, 24. This system eliminates the above problem for the valve 1000.

Said external valve may generally be a device or assembly of parts capable of controlling the flow of fluid.

The external valve is controlled to put the lines 20, 24, and consequently the chambers 66*a* and 66*b*, into communication only when fluid is pushed into the chamber 18*a* of the actuator 10. Thus, the valve pin 12 is brought to the closing end-of-travel position and simultaneously the piston 64 is brought at the end-of-travel position that minimizes the volume of the chamber 66*a*. During the subsequent opening phase of the valve pin 12, the distance traveled by the valve pin 12 will be exactly proportional to the amount of fluid transferred from the chamber 18*a* to the chamber 66*a* and ultimately limited by the end-of-travel position.

A control method for the external valve may be a timing, or any of the methods described above, but this requires precise timing, which is sometimes undesirable.

Another control method that ensures automatic operation of the external valve is to control it as a function of an operating variable of the hydraulic circuit. In this case, the external valve is implemented, for example, as a solenoid valve 310 and said variable is detected by a sensor (not shown), the output signal of which is electronically processed to generate the appropriate electrical control for the solenoid valve 310.

See again the simplified schematic in FIG. 1 for an example.

The line 50 is to be understood herein as being connected to a fluid discharge, at substantially zero pressure.

The solenoid valve 310 is interposed between two conduits 304 by-passing the lines 20, 24, and is controlled by a control unit (not shown), e.g. the same that drives the solenoid valve 40. The solenoid valve 310 comprises a movable drawer 302 displaceable into two positions: a first position in which fluid cannot flow through conduits 304 between the lines 20, 24 (bypassing the chambers 66*a*, 66*b*) and a second position in which fluid can flow.

The operation of the solenoid valve 310 depends on an operating variable of the hydraulic circuit, such as.

the fluid pressure at a point in the circuit (e.g. inside the lines 24 or 22), and/or
a quantity of fluid at a point in the circuit (e.g. in the chamber 18*a*, 66*a*, or 66*b*), and/or
the valve pin position 12, and/or
the position of the piston 64 in the auxiliary reservoir 60.

The abovementioned variable is detected by a sensor (not shown), whose output signal is electronically processed by the control unit to generate the appropriate electrical command for the valve 310.

E.g., the control unit may detect the pressure in the line 22, and trigger the solenoid valve 310 into the second position (as illustrated in FIG. 1) when the pressure in the line 22 is zero or below a threshold, a condition that occurs only when the valve pin 12 is in the closing phase (as in FIG. 1).

The control of the solenoid valve 310 may be hydraulic (valve actuated with spring return) or electrical, or even mechanical.

It is possible to further simplify the system by eliminating the electrical circuit that drives the solenoid valve 310. For example, see the simplified schematic of the system MC2 in FIG. 2, which, however, can include all the variants described for FIG. 1.

Figure 2:
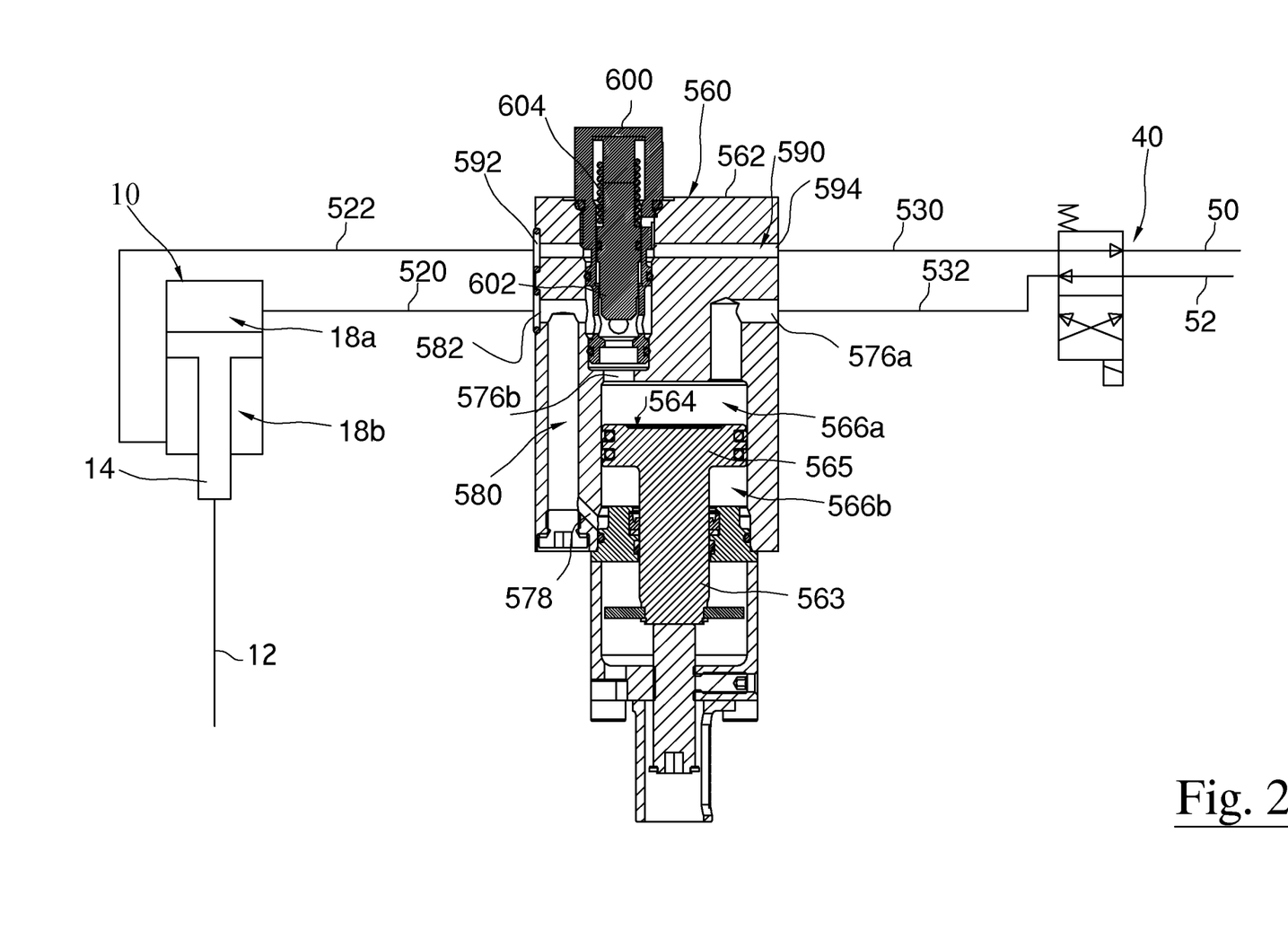
FIG. 2 shows a schematic of a variant.

A reservoir 560, external to the actuator 10, comprises an outer casing 562 having within it a piston 564 linearly movable within a chamber defined by the casing 562. The piston 564, like the piston 14, has a stem 563 and a head 565 that divides said chamber into two sub-chambers 566a, 566b.

The sub-chamber 566a is the one opposite the stem 563 of the piston 564; has the total surface area of the head 565 as its wall, can communicate directly with the outside of the reservoir 560 through a port 576a, and can communicate with the inside of the reservoir 560 through a port 576b The sub-chamber 566b is that which surrounds the stem 563 of the piston 564, has as its wall a partial surface of the head 565, and communicates with the outside of the reservoir 560 through a port 578, which in turn communicates, through an inner conduit 580 of the reservoir 560, with a port 582 leading outside the reservoir 560.

The reservoir body 560 further defines a pass-through duct 590, with two ports 592, 594.

A line 520 allows fluid to be transferred from the chamber 18a to the port 582 and vice versa, while a line 522 allows fluid to be transferred from the chamber 18b to the port 592, and vice versa.

The outlets of the valve 40 are connected to a line 532, connected to the port 576a, and a line 530 connected to the port 594.

A logic valve 600 is installed in the reservoir body 560, having a sliding plunger 602 capable of opening or occluding the passage of fluid between the port 576b and the port 582. The plunger 602 is pushed by a spring 604 to push the plunger 502, downwardly in FIG. 2. The plunger 602 is pushed toward the position where it occludes the passage of fluid between the port 576b and the port 582. The fluid pressure in the pass-through duct 590 helps/increases/adds to the force of the spring 604 to bring and hold the plunger 602 toward the position wherein it closes the fluid passage between the port 576b and the port 582.

The operation of the variant in the diagram of FIG. 2 is as follows.

The control solenoid valve 40 is in a closing configuration for the valve pin 12, as in FIG. 2. The pressurized fluid from the line 532 enters the port 576a and pushes the plunger 564, downward, to increase the volume of the chamber 566a. At the same time, the pressurized fluid acts on the port 576b, pushes the plunger 602 against the spring 604 and flows into the line 520, from which it arrives in the chamber 18a to bring the valve pin 12 to the closing position. The plunger 564 is subject to pressure on both the thrust surfaces, i.e. also in the chamber 566b, but since the surface of the plunger 564 facing the chamber 566a is greater, it moves against (and compresses) the chamber 566b up to an end-of-travel position set, e.g. by a regulation screw.

The pressure in the conduit 590 is approximately zero (the lines 522 and 530 are discharging) so it is irrelevant to the command of valve 600.

It is clear that during the aforementioned closing phase of the valve pin 12:
the valve pin 12 is pushed by the same pressure of the line 520, ensuring the gate closure (high security); and
the volume of the chamber 566b is restored every time to the minimum value, set and imposed by the end-of-travel position of the piston 564, discharging dead volumes of fluid (caused by leakage) and making the system stable and highly repeatable. This solves the above drift problem for the volume of fluid in the chamber 566b and 66a.

To bring the valve pin 12 into the opening position, the solenoid valve 40 switches position by reversing the direction of fluid advancement in the lines 530, 532. Then the pressure in the line 532 decreases, bringing it substantially to zero and simultaneously allowing the spring 604 to push the plunger 602 into the closing position of the port 576b.

This time the pressure in the line 530 has an effect at the control inlet of the valve 600 by cooperating/helping the spring 604 to push the plunger 602 into the closing position, wherein it isolates the ports 576b and 582 and prevents fluid flow between them.

At the same time, the fluid pressure in the line 522, at the entrance of the chamber 18b, drives the valve pin 12 toward the opening position. The chamber 18b fills with fluid while the chamber 18a empties by the same amount. The fluid leaving the chamber 18a arrives at the port 582 and enters the port 580. Here it finds the port 576b closed by the valve 600 and can only enter the chamber 566b through the port 578, displacing the piston 564 and contracting the chamber 566a by expelling the fluid contained therein through the port 576a.

The piston 14 keeps on moving until the piston 564 reaches its end-of-travel position, i.e. it stops when the head 565 meets the opposite wall of the chamber 566a, or until the maximum expansion of the chamber 566b is reached. The maximum expansion of the chamber 566b is obtained following the expulsion of the entire volume of liquid present in the chamber 566a, or when the volume of fluid (incompressible) exchanged from the chamber 18a towards the chamber 566b is limited by the maximum stroke of the piston 564. That is to say that the piston 14 can also be blocked in a predetermined intermediate position with respect to its total available stroke by adjusting the end-of-travel setter of the piston 564 corresponding to the minimum volume of the chamber 566a.

The line 590 is also advantageously isolated from the lines 520 and 532.

The 600 valve also has the advantages:
to be hydraulically driven—in FIG. 2—by the line pressure set by the solenoid valve 40 (unique signal) and does not require management electronics and additional devices; and
to operate regardless of the type of solenoid valve 40 installed.

It is also possible to provide for the use of multiple reservoirs 560, as described in FIG. 2, interacting with a corresponding hydraulic actuator 10, each of which can be activated independently and/or sequentially. In this way, the amount of fluid introduced into the actuator can vary (increasing or decreasing) by activating or deactivating one or more reservoirs, consequently increasing or decreasing the speed of movement of the actuator itself.

In all of the variants described above, appropriate programming of the injection cycle allows the control unit to command/manage the described components in order to achieve any of the opening and/or closing profiles described and shown in the following documents:

PCT/IB2019/053936, IT102017000037002, IT102016000080198, IT102016000055364, IT102015000008368, ITTO2014A001030, ITTO2014A001021, ITTO2014A000701, WO2012/074879A1, WO2012/087491A1, WO2018/020177A1.

The invention claimed is:

1. Method for operating an actuator via a pressurized fluid circuit to move a valve pin of an injection nozzle for molten material within a mold,
   wherein the valve pin moves from a closing position, where no molten material passes through the nozzle, to an opening position, where molten material passes through the nozzle, and vice versa,
   wherein the actuator comprises
      a chamber and
      a piston that is movably mounted in the chamber, linearly displaced by the thrust of the fluid and connected to the valve pin to move it,
   wherein at least one auxiliary tank comprising two fluid chambers separated by a movable wall is connected to the chamber of the actuator,
   a chamber of the auxiliary tank being fluidically connected to the actuator chamber, so that
      the displacement of the movable wall results in a predetermined amount of fluid being sent from the first chamber of the auxiliary tank to the chamber of the actuator, or vice versa with a reverse displacement of the movable wall, and
   the second chamber of the auxiliary tank is connectable to a pressurized fluid source to move the movable wall and bring the valve pin to the closing position,
   with the steps of
      detecting an event which is external to the two chambers of the auxiliary tank and indicative of the condition that the valve pin is traveling toward the closing position, and
      making said two chambers communicable with each other only if and when the event is detected.

2. Method according to claim 1, wherein the two chambers are made communicable by opening a conduit inside and/or outside the same chambers.

3. Method according to claim 1, wherein the event is the reaching of a threshold value for a quantity in the circuit.

4. Method according to claim 1, wherein when the event is detected the movable wall in the auxiliary tank moves due to the thrust of the fluid at the same pressure applied to opposite surfaces of the movable wall which have different areas.

5. System for operating an actuator via a pressurized fluid circuit to move a valve pin of an injection nozzle for molten material within a mold, the system comprising:
   an actuator comprising
      a chamber and
      a piston which is movably mounted within the chamber, linearly displaceable by the thrust of the fluid and connected to the valve pin to move it from a closing position, where there is no passage of molten material through the nozzle, to an opening position, where there is passage of molten material through the nozzle, and vice versa;
   an auxiliary tank that is connected to the chamber of the actuator and comprises two chambers for fluid separated by a movable wall,
   the first chamber of the auxiliary tank being fluidically connected with the actuator chamber, so that
      the displacement of the movable wall results in a predetermined amount of fluid being sent from the auxiliary tank chamber to the actuator chamber, or vice versa with a reverse displacement of the movable wall, and
   the second chamber of the auxiliary tank is connectable to a pressurized fluid source to displace the movable wall and thus move the valve pin toward the closing position,
   the system comprising:
      means for detecting an event external to the chambers of the auxiliary tank and indicative of the condition that the valve pin is traveling toward the closing position, and
      means for making the two chambers of the auxiliary tank communicable with each other only if and when the event is detected.

6. System according to claim 5, wherein the means for detecting comprise a sensor, or means, for detecting the reaching of a threshold value for a quantity in the circuit.

7. System according to claim 6, wherein the means for making the two chambers communicable with each other comprises a valve which
   has an input for detecting the value of a quantity of the circuit at a point outside said two chambers and
   is configured so as to open when a threshold value for the detected value is reached.

8. System according to claim 5, wherein the auxiliary tank comprises
   a pass-through conduit, which at one inlet can be fed by a pressurized fluid source and at the opposite inlet is connected with the actuator chamber different from the one connected with the auxiliary tank,
   the valve being mounted in fluidic communication with the pass-through conduit to be actuated by the pressure of the fluid in said pass-through conduit.

9. System according to claim 5, wherein the movable wall is the head of a piston movably mounted in the auxiliary tank between two opposite end-of-travel positions,
   the head comprising opposite surfaces which have different areas and which form walls of the two chambers of the auxiliary tank, respectively,
   so that the piston can move thanks to the thrust of fluid at the same pressure applied to the surfaces.

10. System according to claim 5, wherein the means for making the two chambers communicable comprises an auxiliary conduit external to the chambers,
    said means for making being arranged in the auxiliary conduit.

11. Method according to claim 3, wherein said quantity is
    the fluid pressure at a point in the circuit outside the chambers, and/or
    a quantity of the fluid at a point in the circuit outside the chambers, and/or
    a quantity of fluid in a chamber of the actuator, and/or
    a quantity of fluid in a chamber of the auxiliary tank, and/or
    the valve pin position, and/or
    the position of the movable wall in the auxiliary tank.

12. System according to claim 6, wherein said quantity is
    the fluid pressure at a point outside said two chambers, and/or
    a quantity of the fluid at a point outside said two chambers, and/or
    a quantity of fluid in a chamber of the actuator, and/or
    a quantity of fluid in a chamber of the auxiliary tank, and/or the valve pin position, and/or the position of the piston in the auxiliary tank.

13. System according to claim 7, wherein said quantity of the circuit at a point outside said two chambers, is the fluid pressure at a point outside the two chambers, and/or a quantity of the fluid at a point outside the two chambers, and/or a quantity of fluid in a chamber of the actuator, and/or a quantity of fluid in a chamber of the auxiliary tank, and/or the valve pin position, and/or the position of the piston in the auxiliary tank.

14. System according to claim 6, wherein the means for making the two chambers communicable with each other comprises a valve which has an input for detecting the value of a quantity of the circuit at a point outside said two chambers, and is configured so as to open when a threshold value for the detected value is reached.

15. System according to claim 14, wherein said quantity of the circuit at a point outside said two chambers, is the fluid pressure at a point outside the two chambers, and/or a quantity of the fluid at a point outside the two chambers, and/or a quantity of fluid in a chamber of the actuator, and/or a quantity of fluid in a chamber of the auxiliary tank, and/or the valve pin position, and/or the position of the piston in the auxiliary tank.

16. System according to claim 7, wherein the means for making the two chambers communicable comprises an auxiliary conduit external to the chambers, said means for making being arranged in the auxiliary conduit.

17. System according to claim 6, wherein the means for making the two chambers communicable comprises an auxiliary conduit external to the chambers, said means for making being arranged in the auxiliary conduit.

18. System according to claim 14, wherein the means for making the two chambers communicable comprises an auxiliary conduit external to the chambers, said means for making being arranged in the auxiliary conduit.

* * * * *